Dec. 13, 1927.
J. P. DALY
1,652,705
AUTOMATIC CLUTCH THROW-OUT MECHANISM
Filed Dec. 23, 1925
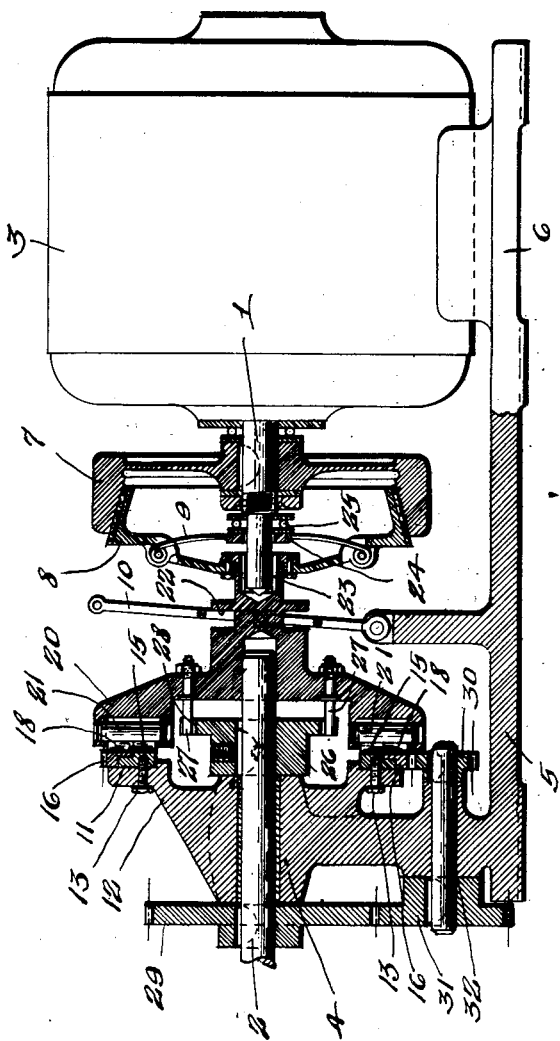
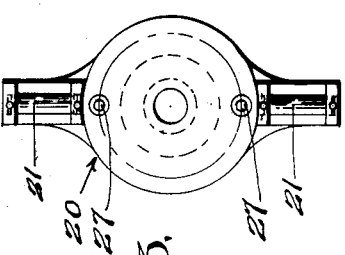
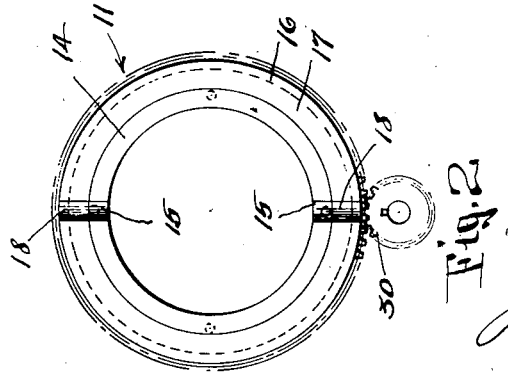
INVENTOR.
Joseph P. Daly.
BY
Parsons & Bradell
ATTORNEYS.

Patented Dec. 13, 1927.

1,652,705

UNITED STATES PATENT OFFICE.

JOSEPH P. DALY, OF SYRACUSE, NEW YORK, ASSIGNOR TO THE PROSPERITY COMPANY INC., OF SYRACUSE, NEW YORK, A CORPORATION OF NEW YORK.

AUTOMATIC CLUTCH-THROW-OUT MECHANISM.

Application filed December 23, 1925. Serial No. 77,342.

This invention relates to clutch mechanism and has for its object a particularly simple, compact and efficient controlling means for automatically throwing out a clutch when the driven shaft actuated by the clutch has made a predetermined plural number of revolutions.

The invention consists in the novel features and in the combinations and constructions hereinafter set forth and claimed.

In describing this invention, reference is had to the accompanying drawings in which like characters designate corresponding parts in all the views.

Figure 1 is a longitudinal vertical sectional view of a clutch mechanism embodying my invention.

Figure 2 is a face view of controller cams.

Figure 3 is a face view of the follower, which coacts with the cams.

This automatic clutch throw-out mechanism comprises, generally, driving and driven shafts, a clutch connecting said shafts including a shiftable section, means for shifting the section to its engaged position, means as a spring tending to throw the section to its out or disengaged position, and controller means for holding the shiftable clutch section in its engaged position and automatically permitting the same to be thrown to its out position and by the spring when the driven shaft has made a predetermined plural number of revolutions.

1 and 2 designate respectively the driving and driven shafts which are preferably arranged in axial alinement, the driving shaft 1 being the armature shaft or the extension thereof of an electric motor 3. The driven shaft is mounted in a suitable bearing 4 supported from a base 5 which is integral with, or fixed to, the base 6 of the motor and hence a unitary structure therewith. The driven shaft 2 is connected to suitable mechanism to be driven through reduction gearing of any description.

7 and 8 are the driving and driven sections of the clutch, one of the sections as the driven section 8 being shiftable axially into and out of engaged position and normally pressed toward its "out" position by any suitable spring means as a spring 9, and shiftable into engaged position manually by a shifter lever as 10.

The driving section 7 is shown as mounted directly upon the driving shaft 1. The driven section is connected to the driven shaft 2 to rotate therewith, as will be presently described.

The controller means comprises a rotatable cam member arranged concentric with the shaft 2 and having a notch or seat in its cam face and a member connected to the driven section 8 to rotate therewith and shift axially therewith and also connected to the driven shaft 2, said member having a follower as a roller normally arranged in the notch or seat of the cam member and connections between the driven shaft and the cam member for rotating it at a different rate of speed than that at which the clutch section and the follower member is rotated by the shaft 2.

As here illustrated, the controller includes two cam rings, one stationary and one movable arranged concentric with each other, both being provided with notches or seats which are normally arranged in alinement and the movable cam ring being shiftable to hold the clutch sections engaged until its notch is being brought into alinement with that of the stationary cam ring. The movable ring is in effect a closure for opening and closing the notch of the fixed ring.

11 designates the fixed cam ring which is mounted concentric with the driven shaft 2 and carried by webs 12 projecting from the bearing 4, it being secured to the bearing by screws 13. This cam ring has an annular plane face 14 and diametrically opposite notches 15.

16 is the movable cam ring mounted to rotate about the stationary ring 11, the rotatable ring 16 having an annular plane face 17 flush with the face 14 of the stationary ring and also having notches 18 normally alined with the notches 15.

20 is the follower member mounted on the driven shaft 2 to rotate therewith and shift axially thereof and connected to the clutch section 8 to shift it. This member 20 has followers or rollers 21 thereon normally arranged in the alined notches 15 and 18 of the cam rings. The driven clutch section 8 is mounted directly upon this follower member and the hub of the follower member is formed with a groove 22 for receiving the fork of the shifting lever 10. The hub of this member 22 also has a pilot bearing 23 for the driving shaft 1. The spring 9 of the clutch section 8 is in the form of radially extending spring arms thrusting at their outer ends against the clutch section 8 and connected at their inner ends to a collar 24 which thrusts against the bearing 25 which in turn thrusts against a shoulder on the end of the shaft 1 adjacent the driving clutch section 7.

The follower member 20 is connected to a collar 26 keyed to the driven shaft 2, the member 20 having a plurality of pins 27 which slide in holes 28 in the collar 26.

The connections between the shaft 2 and the rotatable cam ring 16 consists of a train of gearing, the driving gear 29 of which is mounted on the shaft 2 and the driven gear 30 of which meshes with gear teeth on the periphery of the cam ring 16. The driving gear 29 meshes with the pinion 31 keyed on the shaft 32 journalled in a bearing in the base 5 and the driven pinion 30 is also mounted on this shaft 31.

The gearing is preferably a reduction gearing as for instance, 30 to 1, so that 15 revolutions of the driven shaft 2 causes the cam ring 16 to make a half revolution and bring the notches 18 into alinement with the notches 15 during every fifteen revolutions.

In operation, upon the operating of the shifter lever 10 to throw in the clutch, the followers or rollers 21 will be moved out of the alined notches 15, 18 and the shaft 2 rotated thus carrying the rollers 21 out of alinement with said notches and onto the plane faces 14 and 17 of the cam rings so that the clutch will now be held in as long as the rollers are riding on these plane faces. As the shaft 2 rotates, it actuates the cam ring 16 and the shaft 2 will continue to rotate until the notches 18 of the rotatable cam ring 16 have again come into alinement with the notches 15 so that the rollers or followers 21 can enter such alined notches under the influence of the throw-out spring 9 which thrusts the clutch section 8 out and the follower member 20 to the left to press the rollers into the alined notches.

This mechanism is particularly adapted for machines like pressing machines where heavy pressure is applied from a comparatively small high speed motor and is particularly advantageous in that an especially compact and effective automatic clutch throw-out mechanism can be mounted upon the motor shaft or other high speed shaft so that a much smaller clutch can be used than when a clutch is used connecting two driven elements, which are actuated from a high speed motor through a reduction gearing.

What I claim is:—

1. An automatic throw-out mechanism comprising driving and driven shafts arranged in axial alinement, driving and driven clutch sections rotatable respectively with said shafts, the driving clutch section being mounted on the driving shaft, means for automatically controlling the throwing of the shiftable clutch section to its disengaged position, said means being operated by the driven shaft and comprising a member mounted on the drive shaft and connected to the driven clutch section to rotate and shift axially therewith, said member having a pilot bearing for the driving shaft and being also slidably mounted upon the driven shaft.

2. An automatic clutch throw-out mechanism comprising driving and driven shafts, a clutch connecting said shafts including a shiftable section, means tending to thrust the shiftable section to its out position, means for shifting the shiftable section to its engaged position against the action of the former means, means for holding the clutch in its engaged position and automatically permitting the same to move to its out position when the driven shaft has made a predetermined plural number of revolutions, the last mentioned means comprising a cam ring arranged concentric with the shaft and formed with a notch, a cam ring rotatable about the first cam ring and having a notch normally in alinement with the former notch, a member connected to the driven clutch section to rotate and shift axially therewith, such member having a follower for engaging the cam faces of both of said rings, and normally arranged in the alined notches, and mechanism actuated from the driven shaft for rotating the second cam ring to bring its notch into and out of alinement with the notch of the first cam ring.

3. An automatic clutch throw-out mechanism comprising driving and driven shafts, a clutch connecting said shafts including a shiftable section, means tending to thrust the shiftable section to its out position, means for shifting the shiftable section to its engaged position against the action of the former means, and means for holding the clutch section in its engaged position and automatically permitting the same to move to its out position when the driven shaft makes a predetermined plural number of revolutions, the last mentioned means comprising a rotatable cam ring formed with a notch and a member shiftable with and rotatable with, the shiftable clutch section having a follower coacting with the cam ring and the notch, and connections between the driven shaft and the cam ring for actuating said ring at a different rate than that of the driven shaft.

In testimony whereof, I have hereunto signed my name, at Syracuse, in the county of Onondaga, and in the State of New York, this 18th day of December, 1925.

JOSEPH P. DALY.